(12) United States Patent
Schlitter et al.

(10) Patent No.: US 6,616,164 B1
(45) Date of Patent: Sep. 9, 2003

(54) RECUMBENT CYCLE WITH IMPROVED SEAT SYSTEM AND METHOD

(75) Inventors: Randy Schlitter, Hays, KS (US); John Schlitter, Hays, KS (US)

(73) Assignee: Rans Inc., Hays, KS (US)

( * ) Notice: Subject to any disclaimer, the term of this patent is extended or adjusted under 35 U.S.C. 154(b) by 0 days.

(21) Appl. No.: 09/659,692

(22) Filed: Sep. 11, 2000

Related U.S. Application Data

(60) Provisional application No. 60/152,954, filed on Sep. 9, 1999.

(51) Int. Cl.[7] .................................................. B62K 1/00
(52) U.S. Cl. .............................. 280/288.1; 297/215.14; 297/215.15
(58) Field of Search .......................... 280/288.1, 274, 280/281.1; 297/215.14, 215.15

(56) References Cited

U.S. PATENT DOCUMENTS

| | | | |
|---|---|---|---|
| 4,093,263 A | * 6/1978 | Rihm | 280/288.4 |
| 4,283,070 A | * 8/1981 | Forrestall et al. | 280/288.1 |
| 4,527,811 A | * 7/1985 | DeMoss | 297/215.14 |
| 4,836,604 A | * 6/1989 | Romano | 297/215.14 |
| 5,290,054 A | * 3/1994 | Po | 280/288.1 |
| 5,509,678 A | * 4/1996 | Ullman et al. | 280/288.1 |
| 5,584,494 A | * 12/1996 | Krumm | 280/288.1 |
| 5,607,171 A | * 3/1997 | Labranche | 280/288.1 |
| 5,853,062 A | * 12/1998 | Hulett | 280/288.1 |
| 6,203,043 B1 | * 3/2001 | Lehman | 280/288.1 |

FOREIGN PATENT DOCUMENTS

| GB | 27076 | * 8/1897 | 297/215.14 |
|---|---|---|---|

OTHER PUBLICATIONS

RCN #23 The World's #1 Recumbent Source—Late Summer 1994.
RCN #26/27 Recumbent Cyclist News—1995.
RCN #34 Recumbent Cyclist News—Jun./Jul. 1996.
RCN #37 Recumbent Cyclist News—Jan./Feb. 1997.
RCN #41 Recumbent Cyclist News—Sep./Oct. 1997.
RCN #43 Recumbent Cyclist News—Jan./Feb. 1998.
RCN #52 Recumbent Cyclist News—Jun./Jul. 1999.

* cited by examiner

*Primary Examiner*—Daniel G. DePumpo
(74) *Attorney, Agent, or Firm*—Stephen B. Parker, Esq.; Rothwell, Figg, Ernst & Manbeck, p.c.

(57) ABSTRACT

A recumbent or the like cycle includes an improved seat structure that can be used to facilitate angular positioning of the seat and/or handling of the cycle for transport and/or storage. The seat includes a mounting structure enabling fore-and-aft adjustment along the cycle as well as angular adjustment of the seat. The seat also preferably includes a material having reflective properties incorporated directly into the material of the seat, e.g., such as the fabric of the seat.

20 Claims, 8 Drawing Sheets

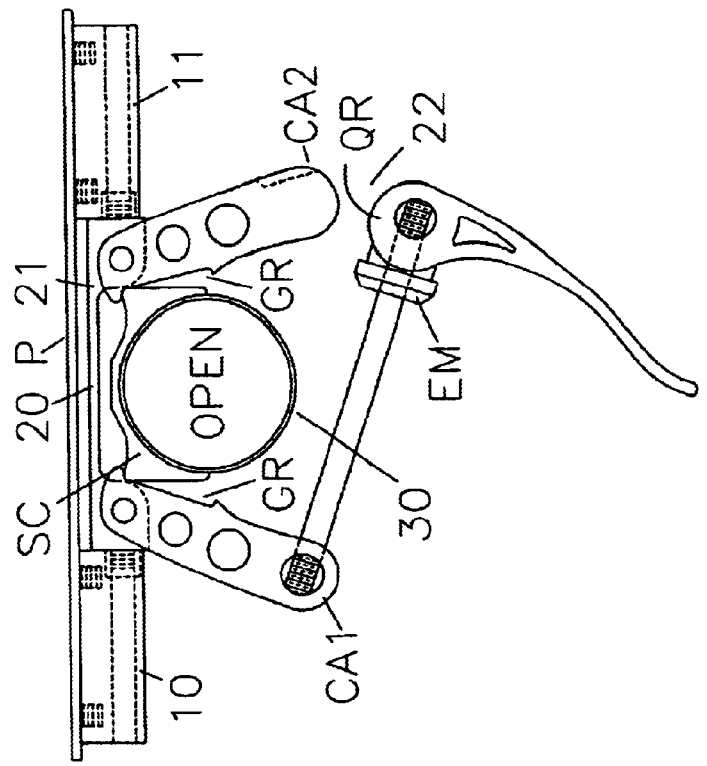
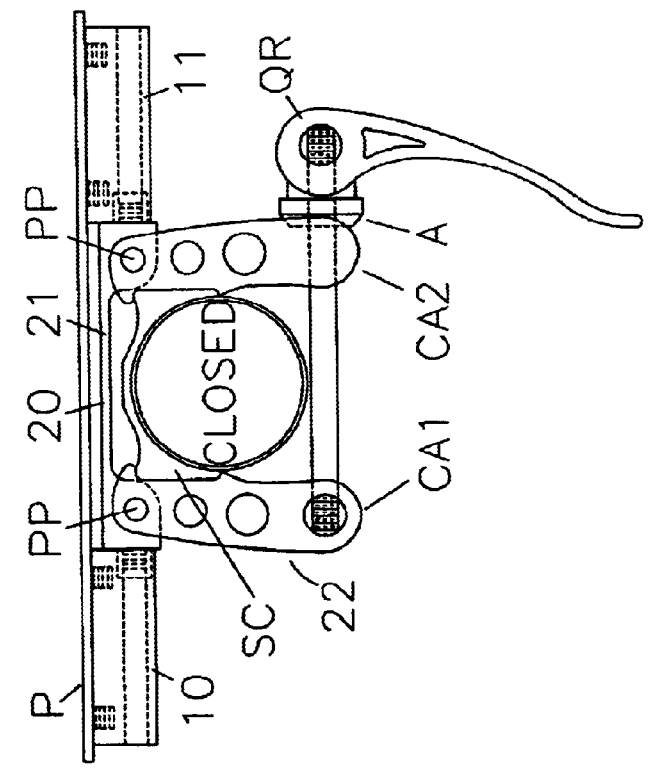
FIG. 1(B)
FIG. 1(A)

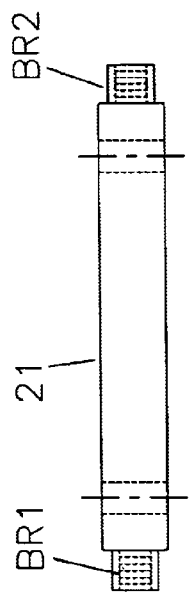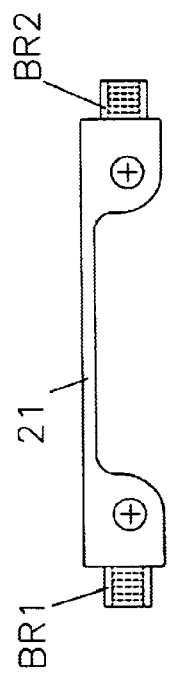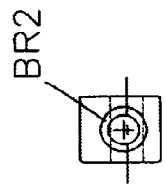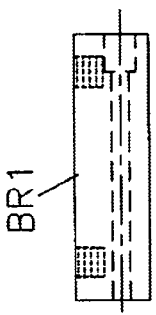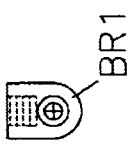

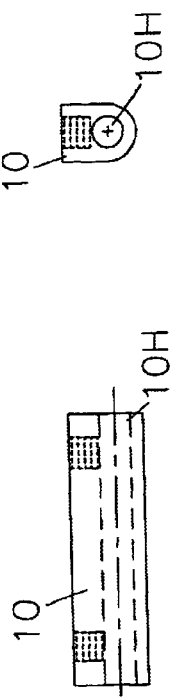
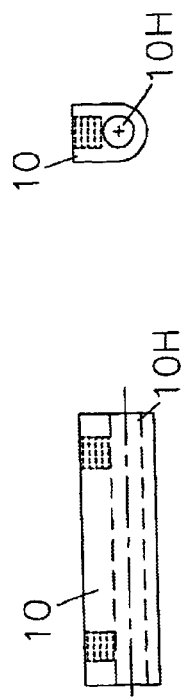
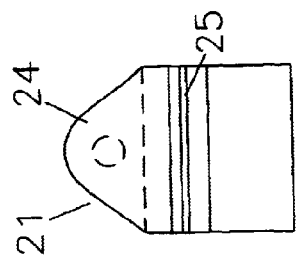
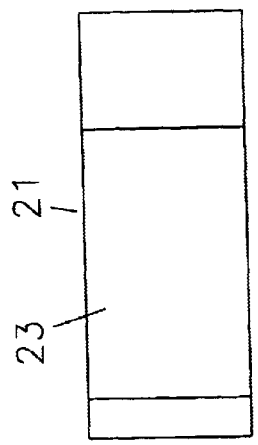
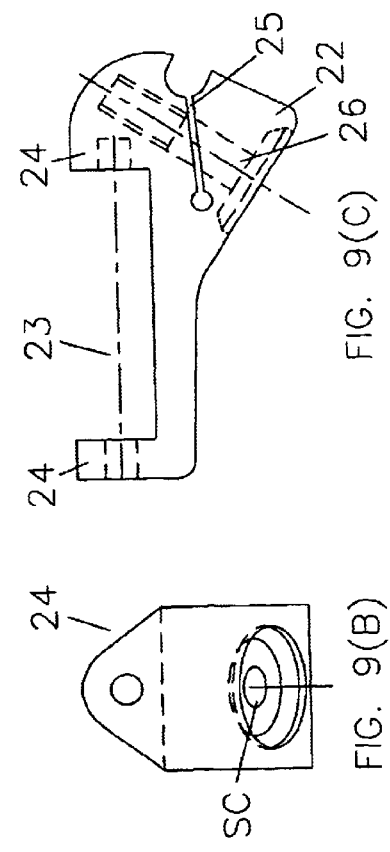
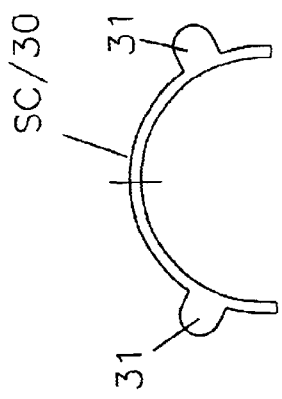

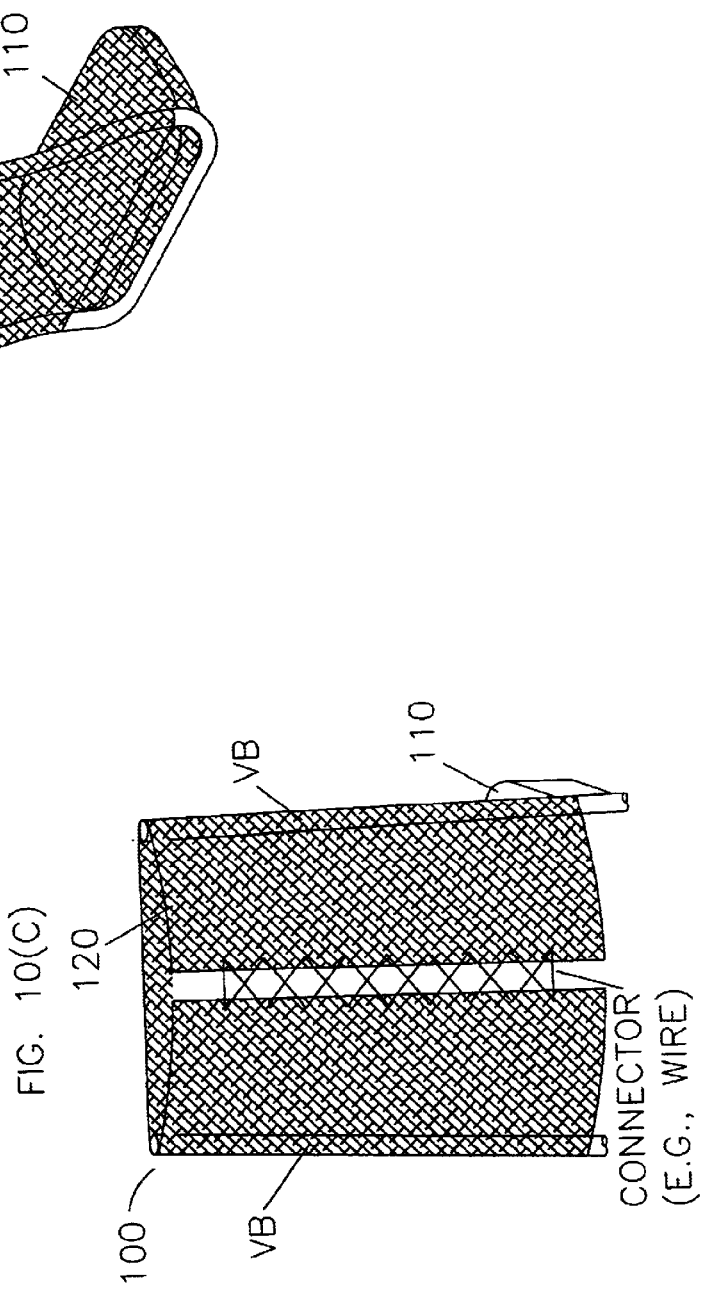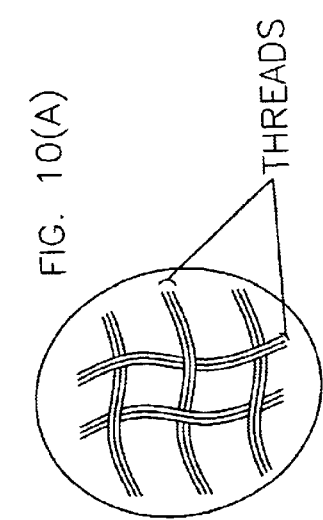

US 6,616,164 B1

RECUMBENT CYCLE WITH IMPROVED SEAT SYSTEM AND METHOD

The present application claims priority to U.S. provisional application serial No. 60/152,954, entitled Improved Recumbent Bicycle Seat, filed on Sep. 9, 1999, the entire disclosure of which is incorporated herein by reference as though recited herein in its entirety.

BACKGROUND OF THE INVENTION

1. Field of the Invention

The present invention relates to human powered cycles in general and, in particular, to human powered recumbent bicycles.

2. Description of the Background

In recent years, recumbent bicycles and other recumbent cycles have gained significant popularity.

With a recumbent cycle, a rider is oriented in a substantially "recumbent" or "reclined" position. Typically, the rider's foot position is s ubstantially in front of the rider's seat position—e.g., usually, the cycle includes foot pedals that are rotatably mounted around a hub and a line between the axis of the hub and a center of the rider's seat is generally more than about 45 degrees from a vertical axis. Recumbent cycles often have enhanced ergonomic qualities and other advantages over common "upright" bicycles.

Usually, recumbent bicycles have seats that are large compared to common upright bicycle seats. FIG. 11 illustrates some exemplary bicycles made by the present inventors at RANS INC.® (see: http:/WWW.rans.com). Specifically, FIG. 11 shows recumbent bicycles R1, R2, R3, R4 and R5 and an exemplary common upright bicycle C6. As shown in FIG. 11, with a common "upright" bicycle, a rider's legs typically pass on either side of the seat S, demanding a narrow and uncomfortable seat design. For this reason, recumbent enthusiasts jocularly refer to common upright bicycles as "wedgies."

On the other hand, recumbent cycles do not require a narrow seat design. Typically, a recumbent bicycle seat is designed to have supporting surfaces under left and right sides of a rider's buttocks and is preferably wide enough to support a rider beneath the left and right ischium bones at the base of a rider's pelvis.

In the illustrative recumbent bicycles of the present inventors shown in FIG. 11, the seats 100 include a seat base 110 that is supported on cross-bar 105 of the recumbent bicycle frame and a back rest 120 that is supported via one or more support rod 130. The support rods may be longitudinally adjustable, such as including telescoping tubes that are fixed together via a fixing mechanism 135. Moreover, as shown, reflector-tape strips 140 may be attached to the seat backs 120. The base 110 also includes a bracket 150 to attach the seat 10 to the cross-bar 105. The cross-bar also includes a seat channel SC that is fitted on the cross-bar 105 to facilitate attachment to the frame.

SUMMARY OF THE INVENTION

The preferred embodiments of the present invention significantly improve upon existing recumbent and the like cycles. Among other advantages, the preferred embodiments of the present invention can greatly facilitate use and/or operation of recumbent and the like cycles.

According to some illustrative embodiments, a recumbent or the like cycle is provided with an improved seat structure that can be used to facilitate angular positioning of the seat and/or handling of the cycle during transport and/or storage. Preferably, the seat structure enables fore-and-aft adjustment as well as angular adjustment of the seat.

According to.some illustrative embodiments, a recumbent cycle is provided that includes: a seat upon which a rider can sit; a frame upon which the seat is supported; a support member connected to the seat; a connecting member connected to the frame; the support member being pivotally mounted to the connecting member so as to pivot around an axis generally transverse to the cycle.

According to other illustrative embodiments, a method for adjusting the angular position of a recumbent-cycle seat includes: providing a support member for a seat base of the cycle; connecting a connecting member to a frame of the cycle; pivoting the support member with respect to the connecting member such that the angular position of the seat changes.

Among other advantages, the preferred embodiments of the present invention can greatly facilitate use and/or operation of recumbent and the like cycles. For example, the preferred embodiments enable easy adjustment of the seat position on a recumbent cycle without the use of tools. In addition, the preferred embodiments enable quick and easy changing of the seat position with minimal or no movement or slippage.

BRIEF DESCRIPTION OF THE DRAWINGS

The preferred embodiments of the present invention are described by way of example and not limitation in the accompanying figures. In summary, FIGS. 1(A) to 5(B) show a first preferred embodiment of the invention, FIGS. 6 to 9(D) show a second preferred embodiment of the invention, and FIGS. 10(A) to 10(C) show a third preferred embodiment of the invention. In particular:

FIG. 1(A) shows a cross-sectional side view of a first preferred embodiment of the present invention with the connector in a closed position;

FIG. 1(B) shows a cross-sectional side view of the first embodiment with the connector in an open position;

FIG. 2(A) is a top view of a mount member shown in FIGS. 1(A) to 1(B);

FIG. 2(B) is a side view of the mount member shown in FIG. 2(A);

FIG. 2(C) is an end view of the mount member shown in FIG. 2(A);

FIG. 3(A) is a top view of a support member shown in FIGS. 1(A) to 1(B);

FIG. 3(B) is a side view of the support member shown in FIG. 3(A);

FIG. 3(C) is an end view of the support member shown in FIG. 3(A);

FIG. 4(A) is a side view of a left clamp arm shown in FIGS. 1(A) to 1(B);FIG.

FIG. 4(B) is a front view of a left clamp arm shown in FIG. 4(A);

FIG. 4(C) is a front view of the right clamp arm shown in FIGS. 1(A) to 1(B);

FIG. 4(D) is a side view of the right clamp arm shown in FIG. 4(C);

FIG. 5(A) is a top view of a seat channel shown in FIGS. 1(A) to 1(B);

FIG. 5(B) is an end view of the seat channel shown in FIG. 5(A);

FIG. 6 shows a front view according to a second preferred embodiment of the present invention;

FIG. 7 shows an end view of a seat channel shown in FIG. 6;,

FIG. 8(A) is a side view of the support member shown in FIG. 6;

FIG. 8(B) is an end view of the support member shown in FIG. 6;

FIG. 9(A) is a top view of a left mount member shown in FIG. 6;

FIG. 9(B) is a left side view of the left mount member shown in FIG. 6;

FIG. 9(C) is a front view of the left mount member shown in FIG. 6;

FIG. 9(D) is a right side view of the left mount member shown in FIG. 6;

FIG. 10(A) is an exploded view showing fabric of a seat back according to another preferred embodiment of the invention;

FIG. 10(B) is a rear perspective view of a seat having a seat back according to another preferred embodiment of the invention;

FIG. 10(C) is a rear perspective view of a seat having a seat back according to another preferred embodiment of the invention.

DETAILED DESCRIPTION OF THE PREFERRED EMBODIMENTS

Figure 4:
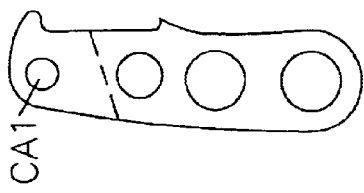
Figure 4:
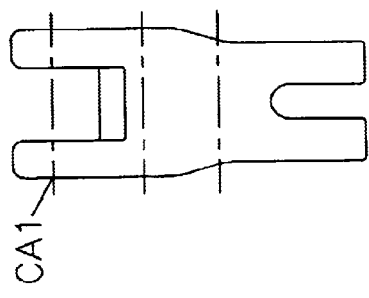
Figure 4:
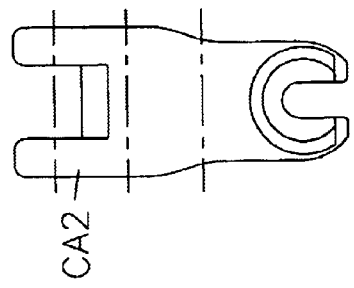
Figure 4:
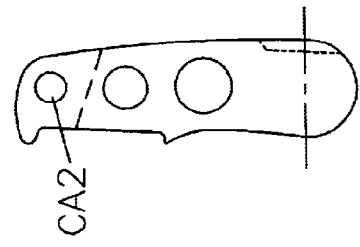
Figure 5:
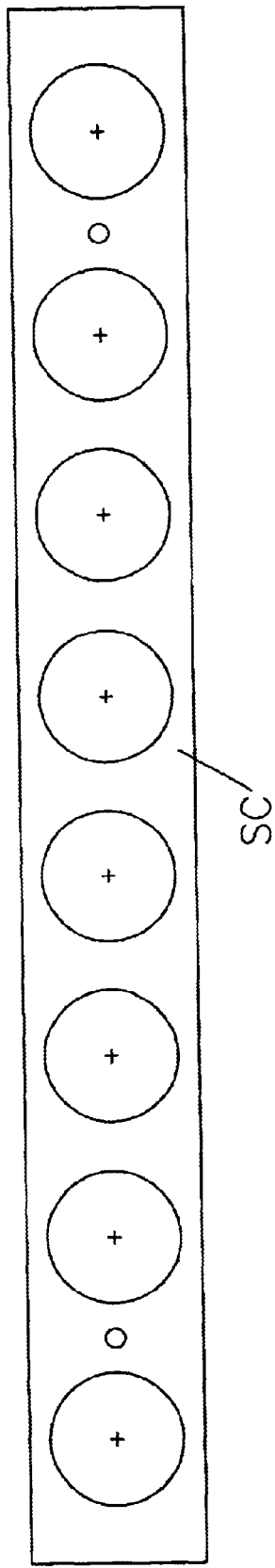
Figure 5:
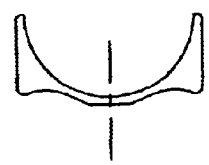
Figure 6:
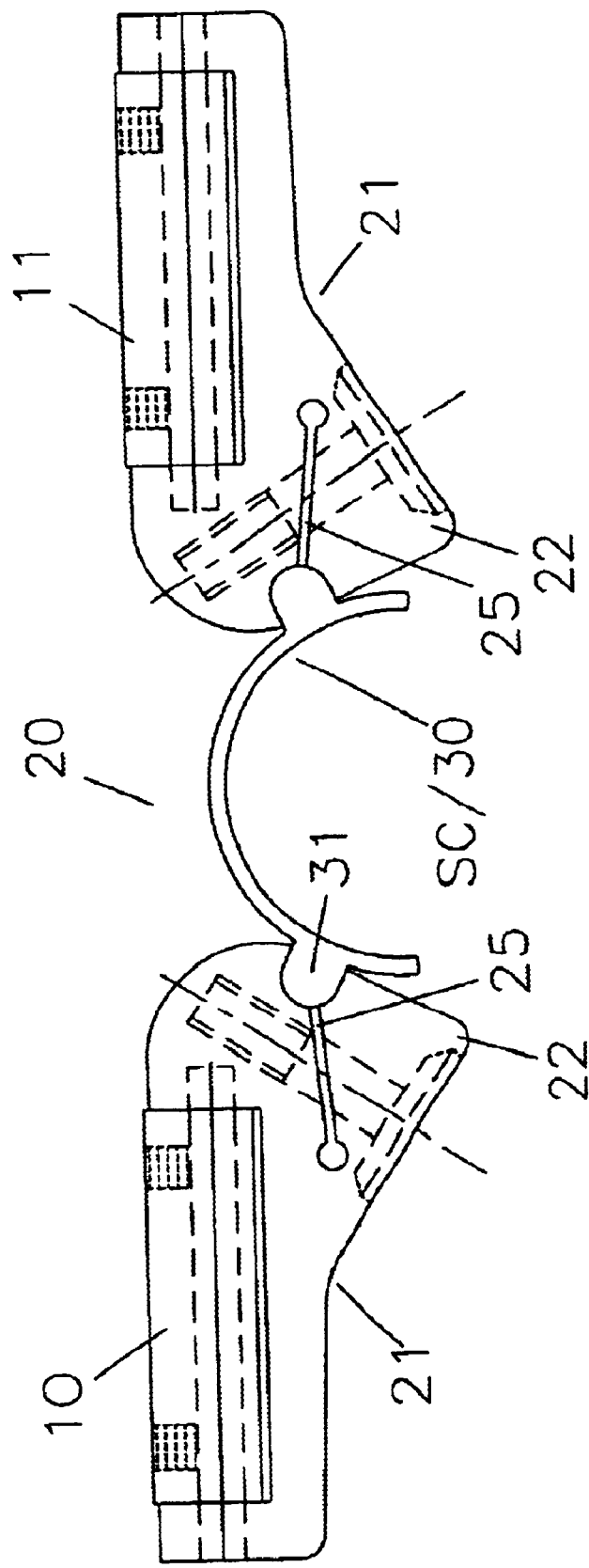

The present invention will now be described with reference to some preferred embodiments thereof. It should be appreciated, however, that the following embodiments are illustrative applications of aspects of the present invention and that various other embodiments may be made by those in the art based on this disclosure.

I. First Embodiment

A first embodiment of the invention is shown in FIGS. 1–5(B). This first embodiment is preferably incorporated in a recumbent cycles. Most preferably, the first embodiment is incorporated in recumbent bicycles, such as for example in any of the recumbent bicycles shown in FIG. 11. In the latter case, as shown in FIGS. 1(A) and 1(B), support members 10, 11 (e.g., mounting blocks or the like) are preferably connected to a bottom end of the seat base 20 (e.g., such as on a rigid bottom panel P as shown in FIGS. 1(A) and 1(B)). For example, the support members 10, 11 can be connected to the base 20 via bolts, screws or other connectors. In the illustrated embodiment, the support members 10, 11 include threaded holes to receive bolts or screws. Alternately, the support members 10, 11 can be integrally connected to the seat—i.e., integrally formed with the seat (e.g., molded or otherwise formed integrally with at least a portion of the seat such as a bottom panel thereof).

Preferably, the support members 10, 11 are pivotally mounted on a connecting member 20. The connecting member 20 is preferably configured to connect to the frame of the cycle. Preferably, the connecting member 20 includes means to releasably connect to the bicycle frame. In preferred embodiments, the connecting member includes a clamping mechanism and, more preferably, a releasable-clamping mechanism that is releasably connectable to the frame.

In the first illustrated embodiment, the connecting member 20 includes a mount 21 that connects to the support members 10, 11 and a clamping mechanism 22 that connects to the frame of the cycle. As shown, the clamping mechanism 22 preferably includes clamp arms CA1, CA2 that are rotatably or pivotally supported on the mount 21 via pivot pins PP. As also shown, the opposite ends BR1 and BR2 of the mount 21 are rotatably or.pivotally fitted within sockets at the inner ends of the support members 10, 11. As also shown, the lower ends of the clamp arms are preferably releasably retainable. In a preferred embodiment, a quick release skewer QR as commonly used in quick-release bicycle wheels, seat posts, etc., can be used to releasably retain the clamp arms. For example, a quick-release mechanism can include a cam that is used to reciprocate an engagement member EM to releasably engage a receptacle CA1 at the end of one of the clamp arms CA. The clamp arms CA preferably create sufficient clamping force (e.g., a sufficient leverage and friction)without having to over-tighten the quick release skewer. Preferably, the point of contact between the clamp arms and the frame or seat channel SC is as close as possible to the pivot pin PP locations.

Preferably, the clamping member requires very little skewer tightening so that it is easy to release the seat from the cycle and/or to move the seat position fore and aft on the frame. In the first embodiment, when the skewer is released, the clamp arms preferably readily move away from the sides of the seat channel. Then, the rider can easily remove the seat and/or slide the seat to a new position.

In a preferred construction of the illustrated embodiment, some or all of the parts, such as, e.g., the clamping member parts, are made with a metal material (e.g., preferably an aluminum alloy and/or stainless steel), with an appropriate composite material and/or with another sufficiently rigid material. In some illustrative embodiments, some or all of the parts are formed via extrusion and/or machining. In some preferred embodiments, some or all of the parts are formed with a finish that is anodized or plated.

While some preferred embodiments include a seat channel SC to facilitate connection to frame, other embodiments do not require such a seat channel. For example, in some embodiments, the connecting member (e.g., via a clamping mechanism or the like) can connect directly to the frame or to another frame supported member. When a seat channel SC is provided, it can enhance structural support and, for example, enhance stiffness across a region where a clamping pressure is applied. In the illustrated embodiment, the clamping arms preferably also include a groove GR that nests over the sides of a seat channel SC to increase clamping friction and to prevent rotation of the arms on the extrusion.

In the preferred embodiment, even if the connecting member is tightly connected to the frame (e.g., such that the connecting member does not move fore or aft on a cross-bar 105 or frame), the seat can still tilt and/or pivot. Among other potential benefits, the rider can thus adjust the seat inclination without having to loosen the position of the connecting member with respect to the frame (e.g., via a clamping mechanism or the like).

Figure 11:
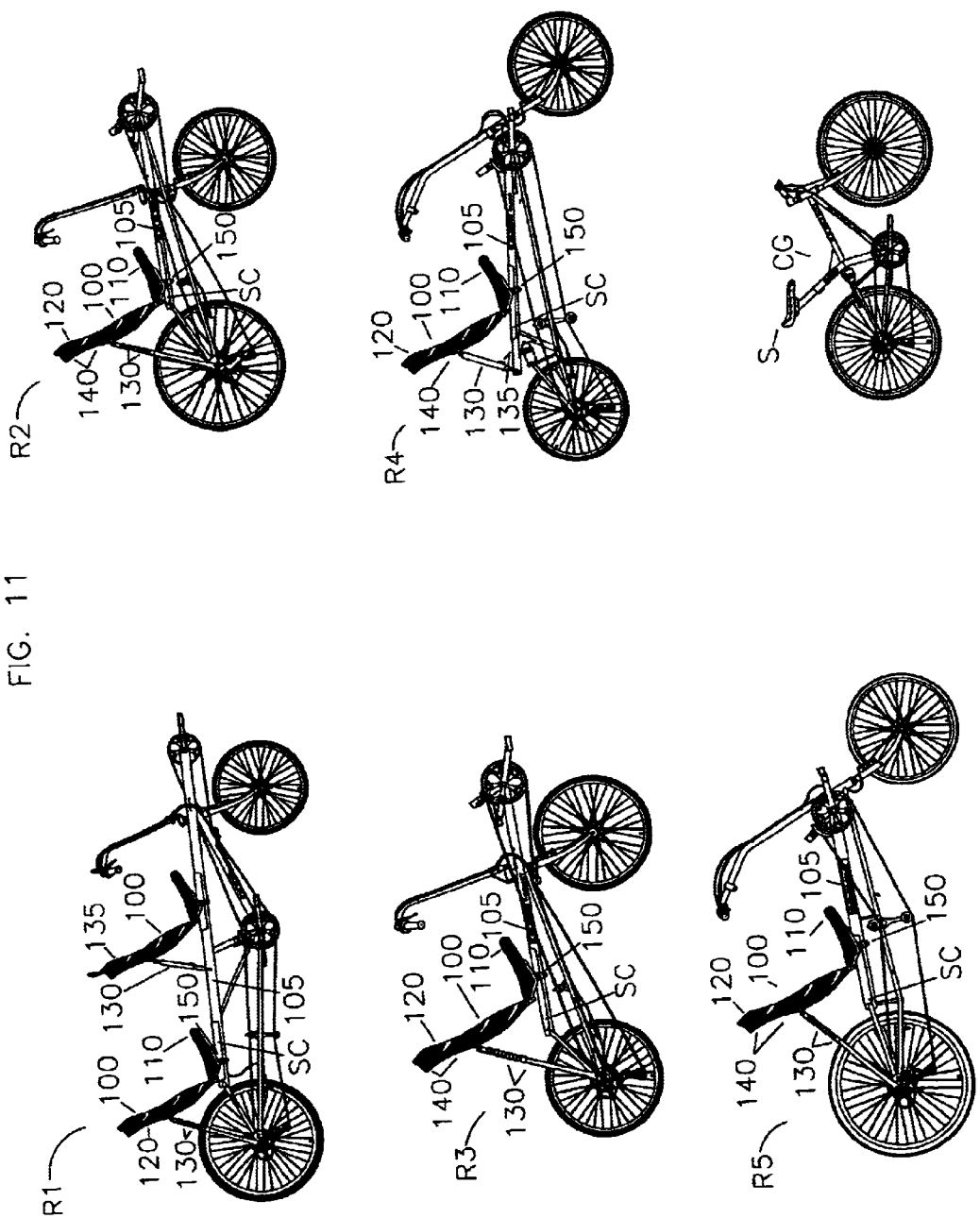
FIG. 11 is a side view showing illustrative recumbent and upright bicycle designs.

In order to adjust the seat inclination, the support members 10, 11 can be pivoted with respect to the connecting member 20 that is connected to the frame. In order to retain the seat at a particular inclination, an additional retaining member is preferably provided. Preferably, rods 130, as shown in FIG. 11, extend to and support the back 120 of the seat. Preferably, the rods 130 are longitudinally adjustable to retain the seat back at a particular position. For example, the rods 130 can preferably be extended or shortened to fix the seat at a desired inclination (e.g., made with telescoping tubes or the like and fixable at a desired position with a fixing mechanism 135 such as a locking bolt, tightening screw or the like). Moreover, the rods 130 are also preferably pivotally connected with respect to the frame (e.g., proximate the rear wheel support, along the cross-bar 105 or at another location) and with respect to the seat back (e.g., to support bars of a seat back or the like) to facilitate use. In alternate embodiments, other retaining members could be used to retain the seat at a particular inclination. As just one of many possible examples, a retaining pin could be applied that is extendable between the mount 21 and at least one of the support members 10, 11.

In some alternative designs, a mechanism could be provided to enable the ends BR2 and/or BR1 to be releasable from its respective support member. For example, a release pin or another releasable mechanism could be incorporated between the support members 10, 11 and the mount 21. Among other things, this allows the connecting member 22 to remain on the cycle, increasing rider convenience by maintaining the seat position even when the seat is removed for transport, storage or the like.

A variety of other advantages can also be achieved with the first embodiment of the present invention as would be understood by those in the art based on this disclosure and upon practicing the invention.

II. Second Embodiment

FIGS. 6 to 9(D) show a second embodiment of the invention. As with the first embodiment, this second embodiment is preferably incorporated within a recumbent cycle, such as, in some examples, within any recumbent bicycle similar to that shown in FIG. 11.

In the illustrated construction of this second embodiment, the connecting member 20 includes two mounts 21. As shown, the mounts 21 preferably include a generally U-shape section 23 for rotatably or pivotally receiving the support members 10, 11. The U-shape section has sides 24 with through-holes that fixedly receive a pivot shaft (not shown) that extends through holes 10H, 11H through the respective support members 10, 11. The support members 10, 11 preferably include means, such as threaded holes as shown, to facilitate connection to the seat via bolts, screws or other means-e.g., to fixedly attach the support members 10, 11 to the seat, such as on a bottom panel P similar to that shown in FIGS. 1(A) and 1(B). In alternative embodiments, the support members 10, 11 can be integrally formed or connected with the seat or a portion of the seat, such as the bottom panel 10, 11.

As shown, the sides 24 preferably taper toward their upper ends to facilitate angular displacement of the mounts 21 without interference with the seat. In addition, the mounts preferably include an integrally formed clamping member 22. In the illustrated construction, each clamping. member 22 is formed by flex slits 25 that extend through the mounts 21. The slits 25 preferably extend to a receiving groove 26 that is configured to receive a longitudinal ridge 31 formed along a seat channel SC or integrally formed along the cross-bar 105 of the frame of the cycle. In order to tighten the clamping member 22, preferably, a bore 26 is formed through the mount 21 transverse to the slit 25. The bore is configured to receive a tightening element, such as a screw, bolt, quick release tightening skewer similar to that shown in FIGS. 1(A) and 1(B), or the like. In order to facilitate operation, a quick release mechanism is preferred. In operation, the tightening element is used to force the clamping member to flex inward into the slit 25 so as to impart a clamping pressure to the ridge 31 (e.g., due to flexibility in the structure and material of the mount 21).

Although the connecting member 20 is formed with two separate mounts 21 in the illustrated embodiment, in other embodiments the mounts 21 can be integrally formed as a single member. In addition, in other embodiments, the clamping members 22 can be tightened or released together, such as by providing a linkage between the tightening element for each mount 21.

In a preferred operation of the second embodiment, a user can release the clamping members so as to enable the mounts 21 to adjustably move fore and aft along the seat channel and/or frame. Preferably, the seat position and/or inclination is adjusted in a manner similar to that described above with respect to the first embodiment. As with the first embodiment, in order to retain the seat at a particular inclination, a retaining member is preferably provided to maintain the angular position of the support members 10, 11 with respect to the connecting member 20 (e.g., to the mounts 21). Preferably, at least one support rod 130, e.g., as shown in FIG. 11, is provided as a retaining member. Preferably, each support rod extends to support the rear side of the seat and is longitudinally adjustable to retain the seat back at a particular position. For example, each rod 130 can preferably be extended or shortened to move the seat to a desired inclination. In this regard, the rods 130 are preferably made with telescoping tubes or the like that are lockable at a desired length or position with a fixing mechanism 135 or the like. Moreover, the rods 130 are also preferably pivotally connected with respect to the frame (e.g., proximate the rear wheel support, the cross-bar 105, or at another location) and with respect to the seat back (e.g., to support bars of the seat back or the like) to facilitate use. As in the first embodiment, in alternate designs, other retaining members could be used to retain the seat at a particular inclination. As just one of many possible examples, a retaining pin could be applied that is extendable between the mount 21 and at least one of the support members 10, 11.

A variety of other advantages can also be achieved with the second embodiment of the present invention as would be understood by those in the art based on this disclosure and upon practicing the invention.

III. Third Embodiment

FIGS. 10(A) to 10(C) illustrate an optional feature of the invention wherein the seat includes a material (e.g., preferably a material of the seat back or a substantial portion thereof) that incorporates reflective material therein (i.e., material that reflects light so as to, e.g., enhance visibility in darkness by, e.g., reflecting light from automotive vehicle headlights). Preferably, the seat back is formed with a sheet of material (e.g., a woven fabric, mesh or the like material made with synthetic polymers or other constituents) having reflective properties.

Preferably, as shown in FIG. 10(B), the seat back is formed with two generally vertical support bars VB that retain a sling-type seat back—i.e., a fabric or mesh material that extends around and between the vertical support bars. Preferably, the seat back includes a tightly stretched fabric supported on the two vertical support bars VB with ends connected together at a mid-region of the rear side of the seat back, such as with a connector wire or other connector as shown in FIG. 10(C).

Preferably, substantially the entire seat back or a large region thereof is made to include reflectivity. For example, the fabric of the seat can be made of a reflective material or can be intertwined with a reflective material. In the latter case, in one example, in the formation of the fabric material, non-reflective strands can be helically intertwined with reflective strands to form threads having helically interwined reflective portions. Alternatively, the strands may include reflective elements such that all of the material has reflectivity. As shown in FIG. 10(A), which is an enlarged view of a region of a the seat back fabric in one illustrative embodiment, the threads of the fabric (e.g., the warps, wefts, etc.) can include reflective material and/or one or more filament of the threads can include reflective material.

This third optional embodiment can be combined with features of the above embodiments and in other recumbent or the like seats. With this third embodiment, a highly reflective seat back having a wide area of reflectivity can be achieved. In addition, additional steps of adding reflectors, such as reflective tape or the like, to the seat can be eliminated. This is particularly advantageous and beneficial in recumbent seat designs having a large seat back that extends above the lumbar region of the cyclist, such as in the recumbent cycles shown in FIG. 11.

Although the present invention has been discussed with reference to some preferred embodiments thereof, various other embodiments, modifications and alterations can be made as would be apparent to those in the art based on this disclosure. In addition, while the attached figures show some illustrative constructions (i.e., generally proportional in dimensions); it is contemplated that various alternative constructions, dimensions, etc., can be made by those in the art depending on circumstances.

What is claimed is:

1. A recumbent cycle, comprising:
   a seat upon which a rider can sit;
   a frame upon which the seat is supported, said frame being a rigid unitary member extending from a front wheel of the cycle to a rear wheel of the cycle and extending under a substantial portion of said seat;
   a support member connected to said seat;
   a connecting member moveably connected to said frame such as to be moveable fore-and-aft on top of a generally horizontal portion of said frame;
   said support member being pivotally mounted to said connecting member so as to pivot around an axis generally istransverse to said cycle;
   wherein said support member includes at least one elongated member connected to a bottom of said seat and having a length extending along said axis;
   wherein a total length of said at least one elongated member is substantially longer than a cross-sectional diameter of said frame below said seat in a direction of said axis;
   wherein said at least one elongated member includes portions extending from proximate opposite sides of said frame in a direction of said axis to generally proximate outer edges of said bottom of said seat.

2. The cycle of claim 1, wherein the connecting member includes a mount that pivotally receives the support member and a clamping member that is releasably clamped to a frame of the cycle.

3. The cycle of claim 2, wherein the clamping member is releasably clamped to the frame via a seat channel.

4. The cycle of claim 1, wherein the support member is integrally formed with a bottom panel of said seat.

5. The cycle of clam 2, wherein the clamping member is pivotally connected to the mount via a pivot pin.

6. The cycle of claim 2, wherein the clamping member is integrally formed as a unitary member with said mount.

7. The cycle of claim 5, wherein the clamping member includes a quick release skewer mechanism.

8. The cycle of claim 6, wherein the clamping member includes a quick release skewer mechanism.

9. The cycle of claim 1, wherein the cycle is a bicycle having two wheels.

10. The cycle of claim 1, wherein the cycle has three or more wheels.

11. The recumbent cycle of claim 1, wherein said elongated member is connected to said bottom of said seat at a plurality of locations along said axis.

12. The recumbent cycle of claim 2, wherein said clamping member is releasable via a manual member located under the bottom of said seat during use, such that a cyclist seated on said seat can reach under the seat beneath his buttocks to grasp the manual member.

13. The recumbent cycle of claim 2, wherein said support member, said mount and said clamping member are all confined to a location below a bottom of said seat during use so as to provide a compact structure for reduced size and weight and convenience in carrying when said seat is separated from the frame by releasing the clamping member.

14. The recumbent cycle of claim 1, wherein the rear wheel is mounted to the frame.

15. A recumbent cycle, comprising:
   a) a seat upon which a rider can sit, a frame upon which the seat is supported, a support member connected to said seat, a connecting member connected to said frame, said support member being pivotally mounted to said connecting member so as to pivot around an axis generally transverse to said cycle; and
   b) said seat including a seat base upon which a rider's buttocks sits during use and a seatback against which a rider's back rests during use, said seat base extending generally horizontally and said seat back extending generally upward, wherein said seat back includes a tightly stretched fabric material supported on generally parallel and generally upward bars, said material having reflective properties such that additional reflectors do not need to be attached to the material to provide reflectivity;
   wherein said fabric material is constructed such that the fabric material is intertwined with reflective material.

16. The recumbent cycle of claim 15, wherein said fabric material includes non-reflective strands intertwined with reflective strands.

17. A recumbent cycle, comprising:
   a) a seat upon which a rider can sit, a frame upon which the seat is supported, a support member connected to said seat, a connecting member connected to said frame, said support member being pivotally mounted to said connecting member so as to pivot around an axis generally transverse to said cycle; and
   b) said seat including a seat base upon which a rider's buttocks sits during use and a seat back against which a rider's back rests during use, said seat base extending generally horizontally and said seat back extending generally upward, wherein said seat back includes a tightly stretched fabric material supported on generally parallel and generally upward bars, said material having reflective properties such that additional reflectors do not need to be attached to the material to provide reflectivity;
   wherein said fabric material includes threads or filaments of threads made with reflective material.

18. A recumbent cycle, comprising:

a) a seat upon which a rider can sit, a frame upon which the seat is supported, and said seat being adjustably mounted upon said frame; and b) said seat including a seat base upon which a rider's buttocks sits during use and a seat back against which a rider's back- rests during use, said seat base extending generally horizontally and said seat back extending generally upward, wherein said seat back includes a tightly stretched fabric material supported on generally parallel and generally upward bars, said material having reflective properties such that additional reflectors do not need to be attached to the material to provide reflectivity;

wherein said fabric material is constructed such that the fabric material is intertwined with reflective material.

19. The recumbent cycle of claim 18, wherein said fabric material includes non-reflective strands intertwined with reflective strands.

20. A recumbent cycle, comprising:

a) a seat upon which a rider can sit, a frame upon which the seat is supported, and said seat being adjustably mounted upon said frame; and b) said seat including a seat base upon which a rider's buttocks sits during use and a seat back against which a rider's back rests during use, said seat base extending generally horizontally and said seat back extending generally upward, wherein said seat back includes a tightly stretched fabric material supported on generally parallel and generally upward bars, said material having reflective properties such that additional reflectors do not need to be attached to the material to provide reflectivity;

wherein said fabric material includes threads or filaments of threads.

* * * * *